United States Patent
Li et al.

(10) Patent No.: US 11,722,479 B2
(45) Date of Patent: Aug. 8, 2023

(54) SECURITY KEY DEVICE, SECURITY AUTHENTICATION SYSTEM, AND SECURITY AUTHENTICATION METHOD

(71) Applicant: GoTrustID Inc., Irvine, CA (US)

(72) Inventors: Jeng-Lung Li, Taichung (TW); Guan-Han Chen, Taichung (TW)

(73) Assignee: GoTrustID Inc., Irvine, CA (US)

( * ) Notice: Subject to any disclaimer, the term of this patent is extended or adjusted under 35 U.S.C. 154(b) by 275 days.

(21) Appl. No.: 17/180,610

(22) Filed: Feb. 19, 2021

(65) Prior Publication Data

US 2022/0046001 A1    Feb. 10, 2022

Related U.S. Application Data

(60) Provisional application No. 63/061,803, filed on Aug. 6, 2020.

(51) Int. Cl.
*H04L 9/40* (2022.01)
*H04L 9/32* (2006.01)

(52) U.S. Cl.
CPC .......... *H04L 63/083* (2013.01); *H04L 9/3263* (2013.01); *H04L 63/0492* (2013.01); *H04L 63/061* (2013.01)

(58) Field of Classification Search
CPC . H04L 63/083; H04L 9/3263; H04L 63/0492; H04L 63/061
See application file for complete search history.

(56) References Cited

U.S. PATENT DOCUMENTS 10,075,437 B1 * 9/2018 Costigan ............... H04L 63/166
10,474,804 B2 * 11/2019 Lee ........................ H04L 9/3231
(Continued)

FOREIGN PATENT DOCUMENTS

| CN | 105656890 | 6/2016 |
| EP | 2887615 | 6/2015 |
| TW | 202024977 | 7/2020 |

OTHER PUBLICATIONS

Chadwick DW, Laborde R, Oglaza A, Venant R, Wazan S, Nijjar M. "Improved identity management with verifiable credentials and FIDO". IEEE Communications Standards Magazine. Dec. 2019;3(4):14-20 (Year: 2019).*

(Continued)

*Primary Examiner* — Catherine Thiaw
(74) *Attorney, Agent, or Firm* — JCIPRNET (57) ABSTRACT

A security key device, a security authentication system, and a security authentication method are provided. The security key device includes a communication module, a security processing unit, and a processing unit. The security processing unit executes an authentication module, a bridge module, and a management module. The authentication module is configured to operate according to a Fast IDentity Online protocol. The management module is configured to operate according to a Public Key Infrastructure protocol. The authentication module receives through the communication module an input command provided based on the Fast IDentity Online protocol by a web authentication module of a browser executed by an electronic device. According to a header of the input command, the authentication module determines that the input command is used to be executed by the authentication module or used to access the management module through the bridge module.

19 Claims, 5 Drawing Sheets

(56) References Cited

U.S. PATENT DOCUMENTS

| | | | |
|---|---|---|---|
| 10,541,995 B1* | 1/2020 | Mossler | H04L 63/0838 |
| 11,159,314 B2* | 10/2021 | Kato | H04L 63/0428 |
| 2015/0180869 A1* | 6/2015 | Verma | H04L 63/0861 |
| | | | 726/4 |
| 2016/0087957 A1* | 3/2016 | Shah | H04L 63/205 |
| | | | 726/1 |
| 2018/0176215 A1* | 6/2018 | Perotti | H04L 63/0853 |
| 2019/0182237 A1* | 6/2019 | Queralt | H04L 63/123 |
| 2020/0213119 A1* | 7/2020 | Schat | G06Q 20/363 |
| 2021/0234677 A1* | 7/2021 | Isenhour | H04L 63/0861 |
| 2021/0377263 A1* | 12/2021 | Law | G06F 21/32 |

OTHER PUBLICATIONS

FIDO Alliance "FIDO UAF Architectural Overview" Implementation Draft Feb. 20, 2018 Excerpts p. 1-43, Editors Editors: Salah Machani, Rob Philpott, Sampath Srinivas, John Kemp, Jeff Hodges, PayPal (Year: 2018).*

"Office Action of Taiwan Counterpart Application", dated Sep. 7, 2021, p. 1-p. 4.

* cited by examiner

SECURITY KEY DEVICE, SECURITY AUTHENTICATION SYSTEM, AND SECURITY AUTHENTICATION METHOD

CROSS-REFERENCE TO RELATED APPLICATION

This application claims the priority benefit of U.S. provisional application Ser. No. 63/061,803, filed on Aug. 6, 2020. The entirety of the above-mentioned patent application is hereby incorporated by reference herein and made a part of this specification.

BACKGROUND

Technical Field

The disclosure relates to an authentication device, and particularly relates to a security key device, a security authentication system, and a security authentication method.

Description of Related Art

As the development and application of various electronic devices diversify, users now have higher demands for data security protection for electronic devices. Such electronic devices may be, for example, personal computers (PC) or mobile devices, and the mobile devices may be, for example, phones or tablets. Specifically, when a user executes a login operation of a web application in a browser of an electronic device, the security of identity authentication of the user is particularly important. In this regard, although the more recently established Fast IDentity Online (FIDO) protocol may be adopted by various browsers such as Safari (iOS and macOS), Chrome (Windows, macOS, Linux, iOS, and Android), and Firefox (Windows, macOS, and Linux), many security applications operating on the browsers still use the older-version Public Key Infrastructure (PKI) protocol to execute login or digital signature operations of the user. Therefore, if the electronic device operated by the user does not support the authentication of the PKI protocol or does not allow access to the PKI authenticator operating on the browser, the user cannot effectively execute a login operation of the web application on the browser. In view of this, solutions of several embodiments will be provided below.

SUMMARY

The disclosure provides a security key device, a security authentication system, and a security authentication method which can provide multiple login mechanisms and realize secure identity authentication functions.

A security key device of the disclosure includes a communication module, a security processing unit, and a processing unit. The security processing unit is configured to execute an authentication module, a bridge module, and a management module. The processing unit is coupled to the communication module and the security processing unit. The authentication module is configured to operate according to a Fast IDentity Online protocol. The management module is configured to operate according to a Public Key Infrastructure protocol. The authentication module receives an input command through the communication module. The input command is provided by a web authentication module of a browser executed by an electronic device based on the Fast IDentity Online protocol. According to a header of the input command, the authentication module determines that the input command is used to be executed by the authentication module or used to access the management module through the bridge module.

A security authentication system of the disclosure includes an electronic device and a security key device. The electronic device is configured to execute a browser. The security key device includes a communication module, a security processing unit, a processing unit, and a confirmation unit. The security processing unit is configured to execute an authentication module, a bridge module, and a management module. The authentication module is configured to operate according to a Fast IDentity Online protocol. The management module is configured to operate according to a Public Key Infrastructure protocol. The processing unit is coupled to the communication module and the security processing unit. The authentication module receives through the communication module an input command provided based on the Fast IDentity Online protocol by a web authentication module of the browser executed by the electronic device. According to a header of the input command, the authentication module determines that the input command is used to be executed by the authentication module or used to access the management module through the bridge module. When the authentication module determines that the input command is used to access the management module through the bridge module, the bridge module determines whether the confirmation unit provides a confirmation signal, so as to output a confidential data of the management module to the authentication module, and then further provide the confidential data to the electronic device by the authentication module.

A security authentication method of the disclosure is adapted for a security key device and an electronic device. The security key device includes an authentication module, a bridge module, a management module, and a confirmation unit. The authentication module is configured to operate according to a Fast IDentity Online protocol, and the management module is configured to operate according to a Public Key Infrastructure protocol. The security authentication method includes the following steps. The security key device is coupled to the electronic device. A browser is executed through the electronic device. The security key device receives an input command provided based on the Fast IDentity Online protocol by a web authentication module of the browser executed by the electronic device. According to a header of the input command, the authentication module determines that the input command is used to be executed by the authentication module or used to access the management module through the bridge module. When the authentication module determines that the input command is used to access the management module through the bridge module, the bridge module determines whether the confirmation unit provides a confirmation signal, so as to output a confidential data of the management module to the authentication module, and then further provide the confidential data to the electronic device by the authentication module.

Based on the above, the security key device, the security authentication system, and the security authentication method of the disclosure may provide relevant authentication functions of the Fast IDentity Online protocol and the Public Key Infrastructure protocol for an identity authentication request required by a web application on a browser.

To make the aforementioned more comprehensible, several embodiments accompanied with drawings are described in detail as follows.

DESCRIPTION OF THE EMBODIMENTS

To make the content of the disclosure more comprehensible, embodiments will be described as examples for implementing the disclosure accordingly. In addition, wherever possible, elements/components/steps labeled with the same reference numerals in the drawings and embodiments refer to the same or similar components.

Throughout the text of the specification (including the claims), the term "couple" refers to any direct or indirect electrical connection means or communicative connection means. For example, where a first device is described to be coupled to a second device in the text, it should be interpreted that the first device may be directly electrically connected or communicatively connected to the second device, or that the first device may be indirectly electrically connected or communicatively connected to the second device through another device or some connection means.

Figure 1A:
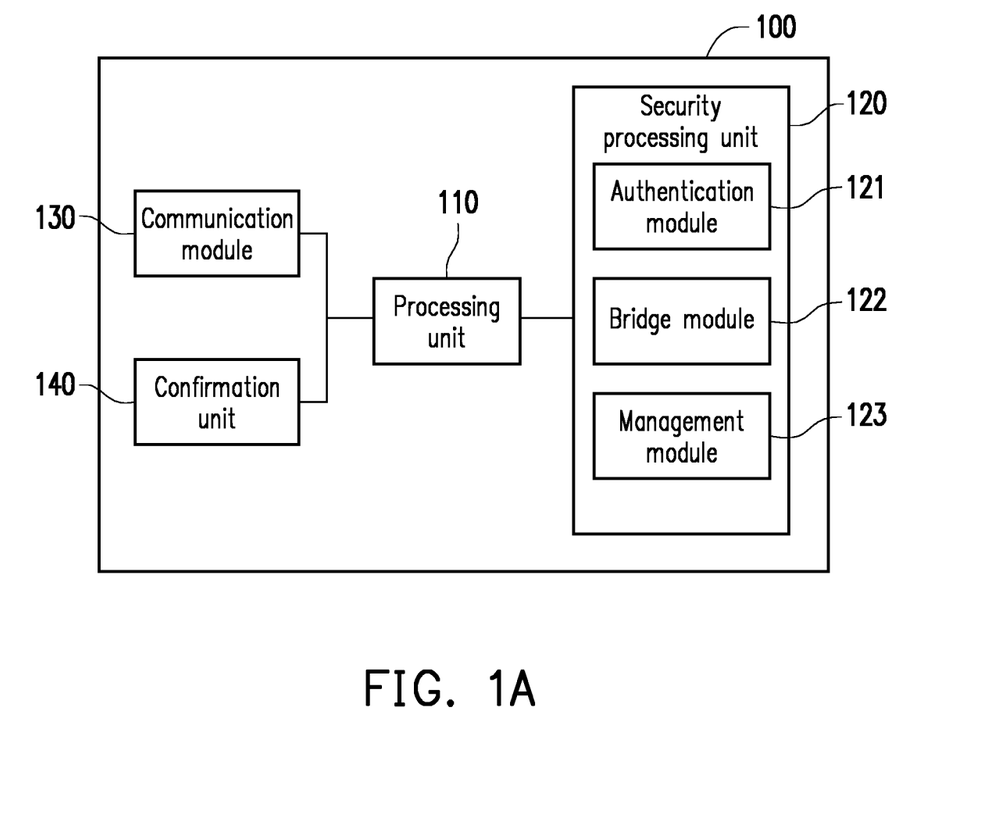
FIG. 1A is a functional block diagram of a security key device according to an embodiment of the disclosure.

FIG. 1A is a functional block diagram of a security key device according to an embodiment of the disclosure. Referring to FIG. 1A, a security key device 100 of the disclosure includes a processing unit 110, a security processing unit 120, a communication module 130, and a confirmation unit 140. The processing unit 110 is coupled to the security processing unit 120, the communication module 130, and the confirmation unit 140. The security processing unit 120 may execute an authentication module 121, a bridge module 122, and a management module 123. In this embodiment, the authentication module 121 is an application created based on the Fast IDentity Online (FIDO) protocol (the disclosure may apply the first-generation FIDO protocol or the second-generation FIDO2 protocol; the following uniformly refers to the "FIDO2 protocol" as an example) to execute operations according to the FIDO2 protocol. The management module 123 is an application created based on the Public Key Infrastructure (PKI) protocol to execute operations according to the PKI protocol.

In this embodiment, the bridge module 122 may bridge the authentication module 121 and the management module 123 to implement operations of data access or command exchange between the authentication module 121 and the management module 123. In addition, the bridge module 122 may be an independent application or a program component belonging to the authentication module 121 or the management module 123. In this embodiment, the communication module 130 may include relevant circuits and hardware components adapted to execute at least one of the Universal Serial Bus (USB) and the Near-Field Communication (NFC) protocol, so that the security key device 100 can communicate with an electronic device having the same communication interface. Alternatively, in another embodiment, the communication module 130 may include relevant circuits and hardware components adapted to execute at least one of the Bluetooth communication protocol and the Near-Field Communication protocol, so that the security key device 100 can communicate with an electronic device having the same communication interface.

In this embodiment, the processing unit 110 and the security processing unit 120 may respectively be processing chips, such as microprocessors, digital signal processors (DSP), programmable controllers, application specific integrated circuits (ASIC), programmable logic devices (PLD), other similar devices, or combinations of these devices. In this embodiment, the processing unit 110 may execute general functional operations and data processing of the security key device 100, or control the security processing unit 120, the communication module 130, and the confirmation unit 140. In addition, the processing unit 110 and the security processing unit 120 may be two independent processing chips, or may be integrated into the same processing chip, but the disclosure is not limited thereto. In an embodiment, the authentication module 121, the bridge module 122, and the management module 123 may be, for example, stored in the security key device 100 in the form of firmware.

Figure 1B:
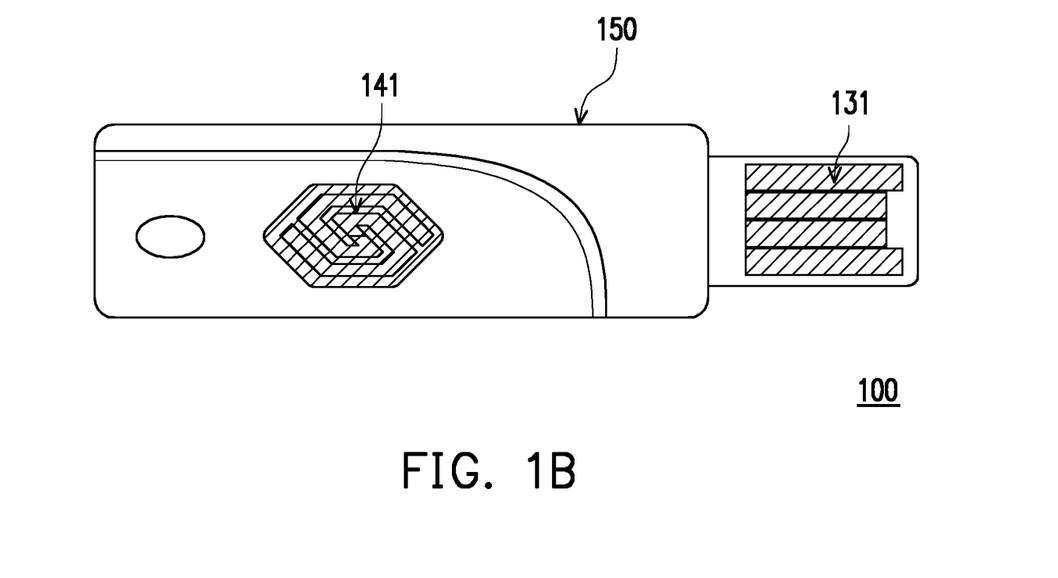
FIG. 1B is a schematic view showing an appearance of a security key device according to an embodiment of the disclosure.

FIG. 1B is a schematic view showing an appearance of a security key device according to an embodiment of the disclosure. Referring to FIG. 1A and FIG. 1B, the security key device 100 of the disclosure may be implemented in the appearance form shown in FIG. 1B, but the disclosure is not limited thereto. In this embodiment, the confirmation unit 140 may be, for example, a touch sensing unit, and includes a metal sensing plate 141. However, the confirmation unit 140 of the disclosure is not limited to the touch sensing form of FIG. 1B. In an embodiment, the confirmation unit 140 may also be a button or a fingerprint sensor. In this embodiment, a housing 150 of the security key device 100 includes a universal serial bus connection port 131 equipped with the communication module 130 and the metal sensing plate 141 of the confirmation unit 140, and the communication module 130 is integrated with relevant circuits of the multiple units and modules as shown in FIG. 1A. Specifically, a user may plug the universal serial bus connection port 131 of the security key device 100 in a corresponding universal serial bus connection port of an electronic device to communicate with the electronic device and implement operations of confidential data access or command exchange as described in the embodiments of the disclosure.

It should be noted that, the security key device 100 of the disclosure may independently implement relevant authentication functions related to the FIDO2 protocol through the authentication module 121. In addition, the security key device 100 may independently implement the operations of creation, management, assignment, use, storage, and revocation of relevant keys, digital certificates, and digital signatures related to the PKI protocol through the management module 123. Further, the security key device 100 of the disclosure may design relevant functional commands of the FIDO2 protocol, so that a command generated based on the FIDO2 protocol can be designed to carry a specific header.

Therefore, when the security key device 100 receives a command having a specific header, the security key device 100 may determine whether the command is used for an authentication operation of the Fast IDentity Online protocol or the command is used for generation of a certificate or signature by the PKI protocol.

Figure 2:
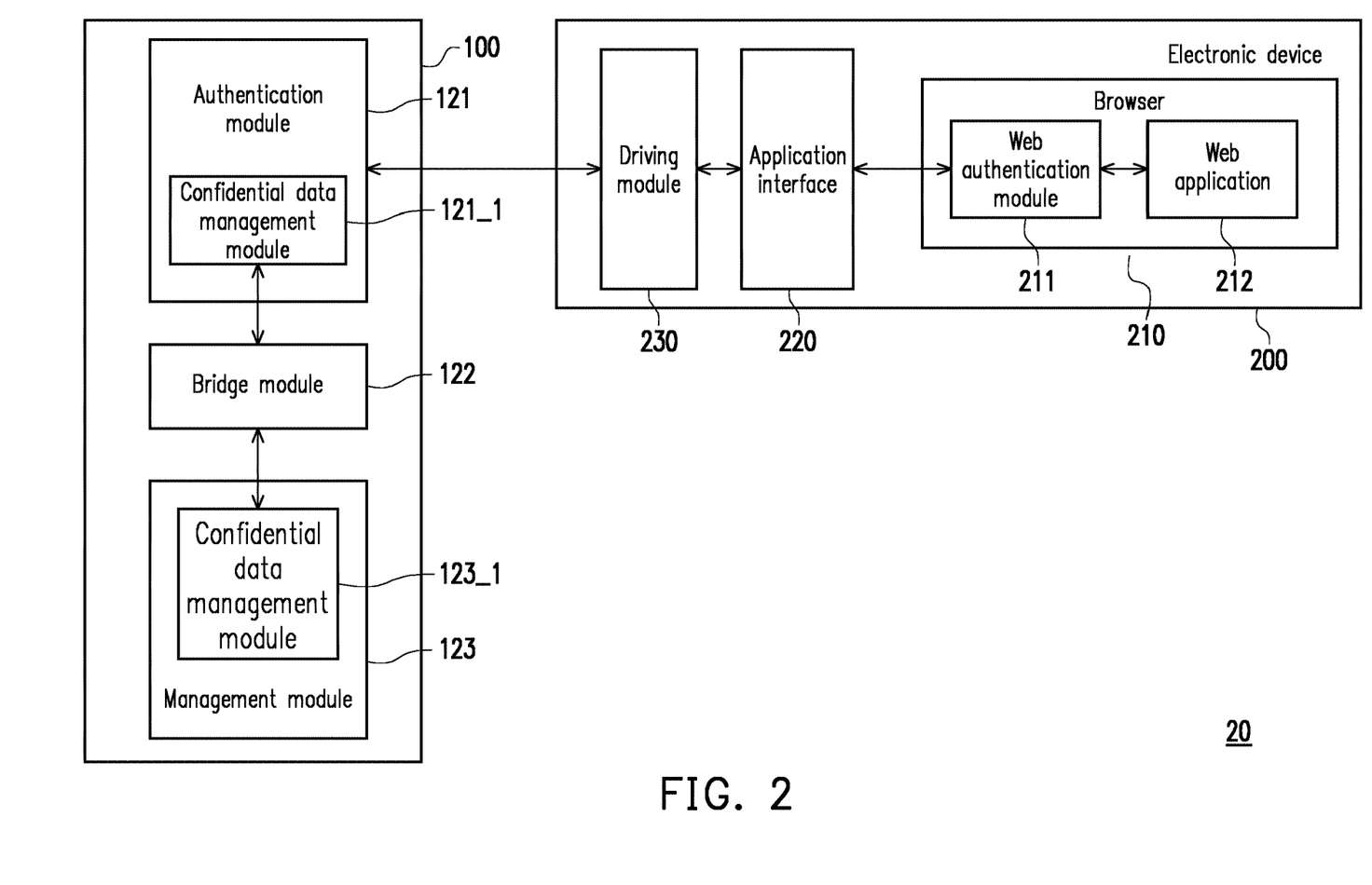
FIG. 2 is a system architecture diagram of a security authentication system according to an embodiment of the disclosure.
Figure 3:
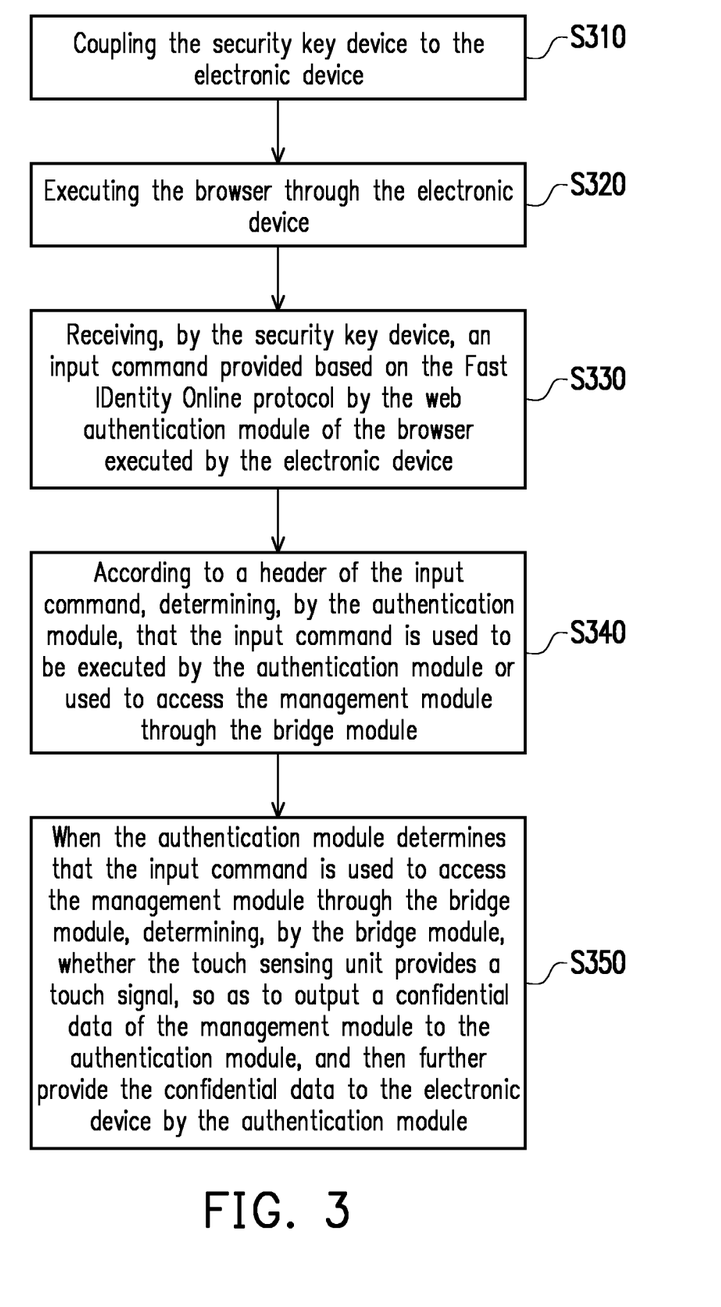
FIG. 3 is a flowchart of a security authentication method according to an embodiment of the disclosure.

FIG. 2 is a system architecture diagram of a security authentication system according to an embodiment of the disclosure. FIG. 3 is a flowchart of a security authentication method according to an embodiment of the disclosure. Referring to FIG. 2, a security authentication system 20 may include a security key device 100 and an electronic device 200. In this embodiment, the security key device 100 may include the multiple units and modules as in the above embodiment of FIG. 1A and FIGS. 1B and 1s not limited to FIG. 2. The electronic device 200 may be a personal computer (PC) or a mobile device, and the mobile device may be, for example, a phone or a tablet. In this embodiment, after the security key device 100 is coupled to the electronic device 200, the electronic device 200 may execute a browser 210, an application interface (API) 220, and a driving module 230 to communicate with the authentication module 121 of the security key device 100 to utilize the security key device 100 to execute relevant security authentication operations.

In this embodiment, the application interface 220 may be a standardized application interface built based on the FIDO2 protocol, and the driving module 230 may be a driver built based on the Client to Authenticator Protocol 2 (CTAP2) of the FIDO2 protocol. In this embodiment, the browser 210 may include a web authentication (WebAuthn) module 211 built based on the FIDO2 protocol and includes a web application 212. In this embodiment, the user may execute the web application 212 of the browser 210 to execute, for example, login operations or relevant identity authentication operations. Therefore, after the browser 210 receives a control command inputted by the user, the browser 210 may execute the web authentication module 211 to generate a command based on the FIDO2 protocol and provide the command to the security key device 100 through the application interface 220 and the driving module 230. In addition, the command may have, for example, the command format of a registration command or an authentication command of the FIDO2 protocol as described in the following embodiments.

Referring to FIG. 2 and FIG. 3, the security authentication system 20 of FIG. 2 may execute steps S310 to S350 of the security authentication method of FIG. 3 to implement the security authentication function provided in the disclosure. In step S310, the user may couple the security key device 100 to the electronic device 200. In step S320, the user may execute the browser 210 through the electronic device 200. In this embodiment, the web application 212 may be run in the browser 210, and the web application 212 requires identity authentication. In step S330, the security key device 100 may receive an input command provided based on the FIDO2 protocol by the web authentication module 211 of the browser 210 executed by the electronic device 200. In step S340, according to a header of the input command, the authentication module 121 of the security key device 100 may determine that the input command is used to be executed by the authentication module 121 or used to access the management module 123 through the bridge module 122.

In step S350, when the authentication module 121 determines that the input command is used to access the management module 123 through the bridge module 122, the bridge module 122 determines whether the confirmation unit (e.g., the metal sensing plate 141 in FIG. 1B) provides a confirmation signal, so as to output a confidential data of the management module 123 to the authentication module 121, and then the authentication module 121 further provides the confidential data to the web application 212 of the electronic device 200. In other words, for example, the security authentication system 20 of this embodiment may allow the electronic device 200 to assign, through the input command generated according to the FIDO2 protocol, relevant key data (key pair) which are generated by the management module 123 according to the PKI protocol and managed or stored in the management module 123 of the security key device 100, so as to further generate a corresponding electronic signature.

More specifically, the authentication module 121 may include a confidential data management module 121_1, and the confidential data management module 121_1 may, for example, manage or store relevant certificates generated based on the FIDO2 protocol. The management module 123 may include a confidential data management module 123_1, and the confidential data management module 123_1 may, for example, manage or store relevant key data, certificate data, and personal identification numbers (PIN) generated based on the PKI protocol. In this embodiment, the web authentication module 211 of the browser 210 may provide an input command having a specific header to the authentication module 121, and the specific header may be, for example, 16 bytes. Moreover, input command indicates that it is used to access the management module 123 (indicating that it is adapted for application by the PKI protocol). Therefore, after the authentication module 121 identifies the input command having the specific header, the authentication module 121 may request, through the bridge module 122, the management module 123 to output a confidential data (e.g., a corresponding signature or certificate) from the confidential data management module 123_1. Furthermore, before the management module 123 outputs the confidential data, the bridge module 122 may first determine whether the confirmation unit provides a confirmation signal, i.e., determining whether the user touches the metal sensing plate 141 as shown in FIG. 1B. Moreover, when the user indeed touches the metal sensing plate 141 as shown in FIG. 1B, the bridge module 122 will then output the confidential data of the management module 123 to the authentication module 121, and the authentication module 121 will provide it to the web application 212 of the electronic device 200.

However, the security authentication system 20 of the disclosure is not limited to the above embodiment. In an embodiment, the web authentication module 211 of the browser 210 may provide another input command having another header to the authentication module 121, so that the authentication module 121 may access relevant certificate data that are generated based on the FIDO2 protocol and managed or stored by the confidential data management module 121_1 according to the request of this another input command, and provide them to the web application 212 of the electronic device 200. Alternatively, in another embodiment, the electronic device 200 may also include an application interface built based on the Public-Key Cryptography Standards (PKCS #11), and the electronic device 200 may utilize the above application interface to directly access the management module 123 through the universal serial bus of the security key device 100 to obtain the confidential data (i.e., the corresponding signature or certificate) in the confidential data management module 123_1, and provide it to the application (not limited to the browser) in the electronic device 200 for use.

In addition, multiple detailed exemplary embodiments of different login mechanisms based on the infrastructure of the above embodiments will be further described below.

Figure 4:
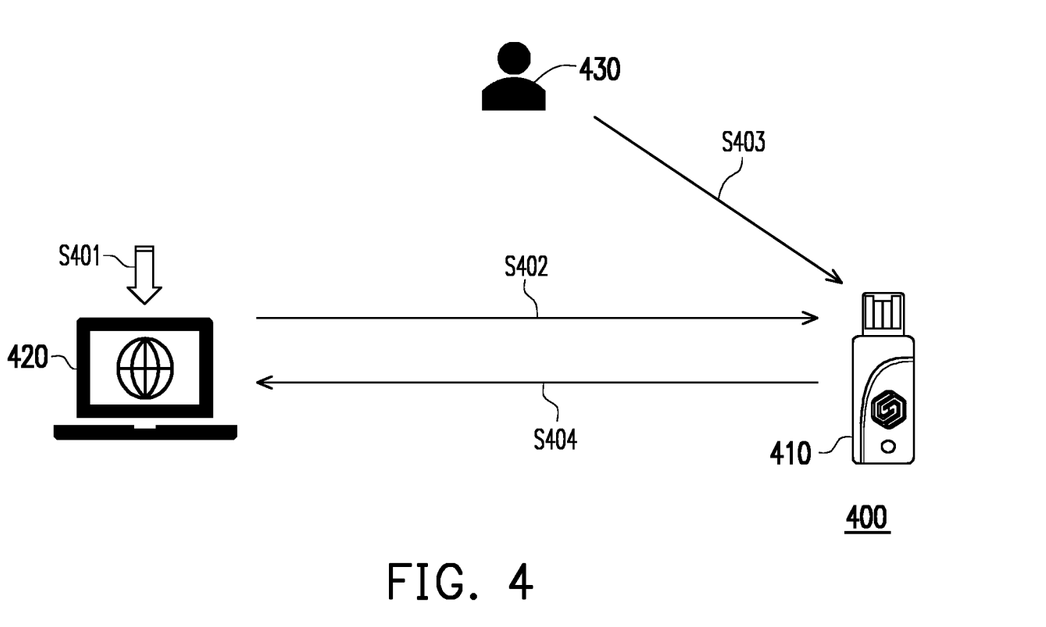
FIG. 4 is a schematic view of an operation situation of a security authentication system according to a first embodiment of the disclosure.

FIG. 4 is a schematic view of an operation situation of a security authentication system according to a first embodiment of the disclosure. Referring to FIG. 4, a security authentication system 400 may include a security key device 410 and an electronic device 420. For the relevant technical details and implementations of the security key device 410 and the electronic device 420 of this embodiment, please refer to the above description of the embodiments in FIG. 1A to FIG. 3. In this embodiment, the security authentication system 400 may execute the following operations S401 to S404 to read a certificate data from the security key device 410 for the electronic device 420 to execute relevant authentication operations. Specifically, the security key device 410 may be coupled to the electronic device 420 in advance. A user 430 may execute a login operation of a web application in a browser of the electronic device 420, and the login operation of the web application of the browser of the electronic device 420 requires to obtain a certificate data generated by the PKI protocol. In operation S401, the browser of the electronic device 420 may call the web authentication module, and the web authentication module generates an input command based on the FIDO2 protocol. The input command may have a command format of a registration command regulated by the FIDO2 protocol.

In operation S402, the electronic device 420 outputs the input command to the security key device 410, and the input command may include a specific header and a certificate request command. In operation S403, when the authentication module of the security key device 410 determines that the input command is used to access the management module according to the specific header, the security key device 410 may prompt the user to press the confirmation unit of the security key device 410 (e.g., by emitting a prompt light or a prompt sound by an additional light-emitting unit or speaker unit) to allow output of the confidential data. After the security key device 410 senses the touch of the user 430, in operation S404, the authentication module of the security key device 410 may obtain a certificate data generated based on the PKI protocol according to the certificate request command contained in the input command, and output the certificate data to the web application of the browser of the electronic device 420, so that the web application of the electronic device 420 can execute relevant identity authentication operations. Therefore, the security authentication system 400 of this embodiment can provide a secure identity authentication function.

Figure 5:
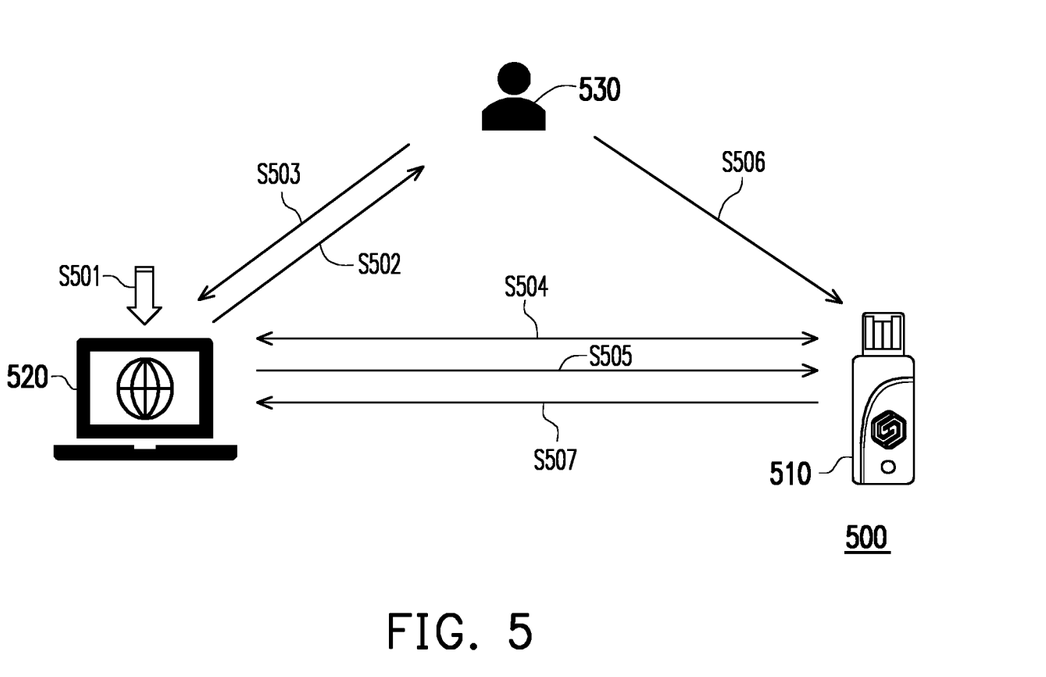
FIG. 5 is a schematic view of an operation situation of a security authentication system according to a second embodiment of the disclosure.

FIG. 5 is a schematic view of an operation situation of a security authentication system according to a second embodiment of the disclosure. Referring to FIG. 5, a security authentication system 500 may include a security key device 510 and an electronic device 520. For the relevant technical details and implementations of the security key device 510 and the electronic device 520 of this embodiment, please refer to the above description of the embodiments in FIG. 1A to FIG. 3. In this embodiment, the security authentication system 500 execute the following operations S501 to S507 to read a certificate data from the security key device 510 for the electronic device 520 to execute relevant authentication operations. Specifically, the security key device 510 may be coupled to the electronic device 520 in advance. A user 530 may execute a login operation of a web application in a browser of the electronic device 520, and the login operation of the web application of the browser of the electronic device 520 requires to first verify a personal identification number of the user, and then requires to obtain a certificate data generated by the PKI protocol. In operation S501, the browser of the electronic device 520 may call the web authentication module, and the web authentication module generates an input command based on the FIDO2 protocol. The input command may have a command format of a registration command regulated by the FIDO2 protocol. In operation S502, the web authentication module of the electronic device 520 may pop up an operation window in the browser to request the user 530 to enter a personal identification number. In operation S503, the web authentication module of the electronic device 520 may obtain the personal identification number entered by the user 530 through the operation window of the browser. In operation S504, the web authentication module of the electronic device 520 may communicate with the authentication module of the security key device 510 to execute personal identification number verification of the FIDO2 protocol (FIDO Client PIN Verification).

Then, after the above personal identification number verification is passed, in operation S505, the electronic device 520 outputs the input command to the security key device 510, and the input command may include a specific header and a certificate request command. In operation S506, when the authentication module of the security key device 510 determines that the input command is used to access the management module according to the specific header, the security key device 510 may prompt the user to press the confirmation unit of the security key device 510, for example, by emitting a prompt light or a prompt sound by an additional light-emitting unit or speaker unit, to allow output of the confidential data. After the security key device 510 senses the touch of the user 530, in operation S507, the authentication module of the security key device 510 may obtain a certificate data generated based on the PKI protocol according to the certificate request command contained in the input command, and output the certificate data to the web application of the electronic device 520, so that the web application of the electronic device 520 can execute relevant identity authentication operations. Therefore, the security authentication system 500 of this embodiment can provide a secure identity authentication function.

Figure 6:
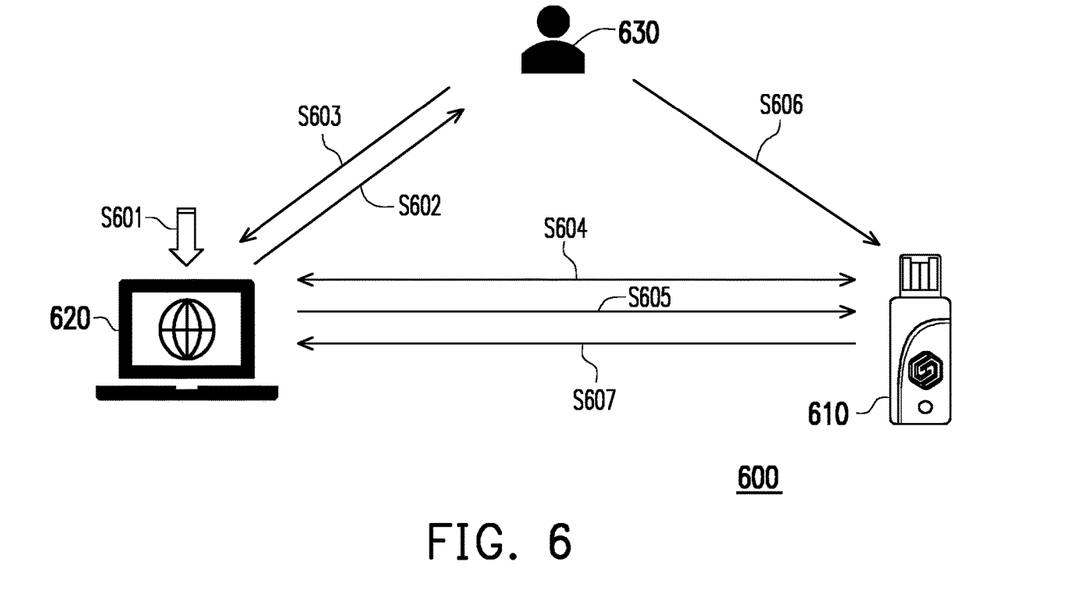
FIG. 6 is a schematic view of an operation situation of a security authentication system according to a third embodiment of the disclosure.

FIG. 6 is a schematic view of an operation situation of a security authentication system according to a third embodiment of the disclosure. Referring to FIG. 6, a security authentication system 600 may include a security key device 610 and an electronic device 620. For relevant technical details and implementations of the security key device 610 and the electronic device 620 of this embodiment, please refer to the above description of the embodiments in FIG. 1A to FIG. 3. In this embodiment, the security authentication system 600 may execute the following operations S601 to S607 to read a signature data from the security key device 610 for the electronic device 620 to execute relevant authentication operations. Specifically, the security key device 610 may be coupled to the electronic device 620 in advance. A user 630 may execute a login operation of a web application in a browser of the electronic device 620, and the login operation of the web application of the browser of the electronic device 620 requires to first verify a personal identification number of the user, and then requires to obtain a signature data generated by the PKI protocol. In operation S601, the browser of the electronic device 620 may call the web authentication module, and the web authentication module generates an input command based on the FIDO2 protocol. The input command may have a command format of an authentication command regulated by the FIDO2 protocol. In operation S602, the web authentication module of the electronic device 620 may pop up an operation window in the browser to request the user 630 to enter a personal identification number. In operation S603, the web authentication module of the electronic device 620 may obtain the personal identification number entered by the user 630 through the operation window of the browser. In operation S604, the web authentication module of the electronic device 620 may communicate with the authentication module of the security key device 610 to execute personal identification number verification of the FIDO2 protocol (FIDO Client PIN Verification). In other words, this embodiment verifies the personal identification number by the FIDO2 protocol to effectively verify the holder of the security key.

Then, after the above personal identification number verification is passed, in operation S605, the electronic device 620 outputs the input command to the security key device 610, and the input command may include a specific header, a signature request command, and a signature generation reference data. In operation S606, when the authentication module of the security key device 610 determines that the input command is used to access the management module according to the specific header, the security key device 610 may prompt the user to press the confirmation unit of the security key device 610, for example, by emitting a prompt light or a prompt sound by an additional light-emitting unit or speaker unit, to allow output of the confidential data. After the security key device 610 senses the touch of the user 630, in operation S607, the authentication module of the security key device 610 may obtain a signature data generated based on the PKI protocol according to the signature request command and the signature generation reference data contained in the input command, and output the signature data to the web application of the electronic device 620, so that the web application of the electronic device 620 can execute relevant identity authentication operations. Therefore, the security authentication system 600 of this embodiment can provide a secure identity authentication function.

However, in some other embodiments of the disclosure, if the confirmation unit (e.g., the confirmation unit 140 in FIG. 1A) adopted in the security key device 610 of this embodiment is a fingerprint sensor, in this embodiment, steps S602 to S604 for verifying the holder of the security key may be omitted, and only steps S601 and S605 to S607 are executed. In other words, in another embodiment, the security key device 610 may first execute fingerprint sensing through the confirmation unit, and the security key device 610 may then execute fingerprint verification to verify the holder of the security key.

Figure 7:
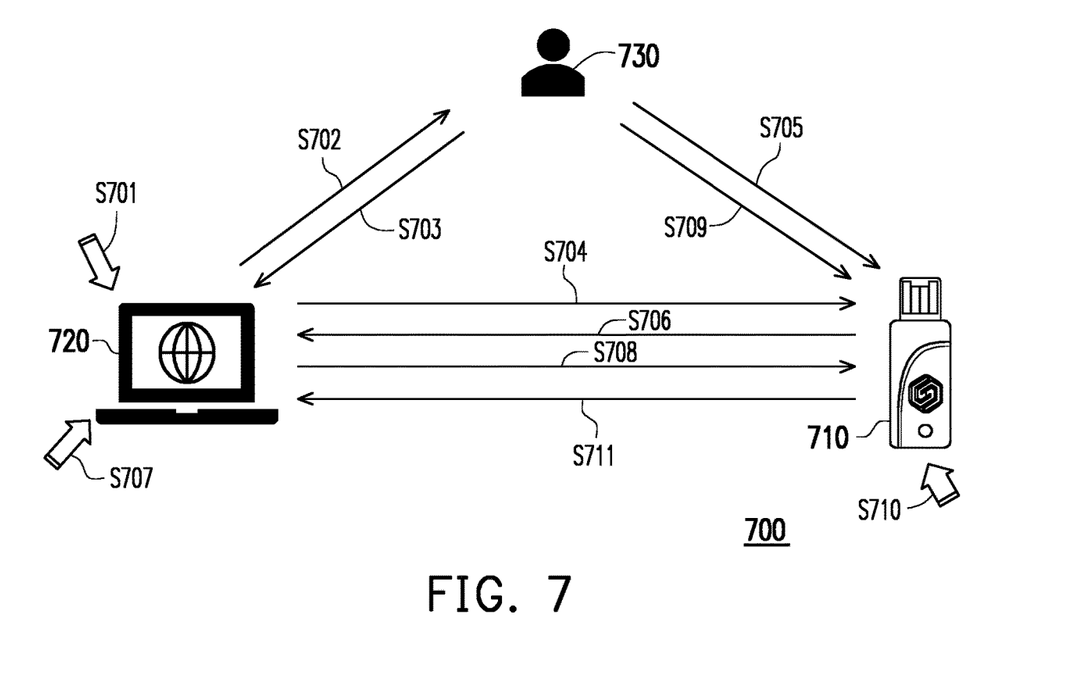
FIG. 7 is a schematic view of an operation situation of a security authentication system according to a fourth embodiment of the disclosure.

FIG. 7 is a schematic view of an operation situation of a security authentication system according to a fourth embodiment of the disclosure. Referring to FIG. 7, a security authentication system 700 may include a security key device 710 and an electronic device 720. For relevant technical details and implementations of the security key device 710 and the electronic device 720 of this embodiment, please refer to the above description of the embodiments in FIG. 1A to FIG. 3. In this embodiment, the security authentication system 700 may execute the following operations S701 to S711 to read a signature data from the security key device 710 for the electronic device 720 to execute relevant authentication operations. Specifically, the security key device 710 may be coupled to the electronic device 720 in advance. A user 730 may execute a login operation of a web application in a browser of the electronic device 720, and the login operation of the web application of the browser of the electronic device 720 requires to first verify a personal identification number of the user, and then requires to obtain a signature data generated by the PKI protocol. In operation S701, the web authentication module of the electronic device 720 may pop up an operation window in the browser to request the user 730 to enter a personal identification number. In operation S702, the web authentication module of the electronic device 720 may obtain the personal identification number entered by the user 730 through the operation window of the browser. In operation S703, the browser of the electronic device 720 may call the web authentication module, and the web authentication module generates an input command based on the FIDO2 protocol. The input command may have a command format of a registration command regulated by the FIDO2 protocol.

Next, in operation S704, the electronic device 720 outputs the input command to the security key device 710, and the input command may include a specific header and a verification request command. In operation S705, when the authentication module of the security key device 710 determines that the input command is used to access the management module according to the specific header, the security key device 710 may prompt the user to press the confirmation unit of the security key device 710, for example, by emitting a prompt light or a prompt sound by an additional light-emitting unit or speaker unit, to allow output of the confidential data. After the security key device 710 senses the touch of the user 730, in operation S706, the authentication module of the security key device 710 may obtain a session key data generated based on a key exchange mechanism (e.g., the Elliptic Curve Diffie-Hellman key exchange (ECDH) protocol) according to the verification request command contained in the input command, and output the session key data to the electronic device 720.

In operation S707, the web authentication module of the browser of the electronic device 720 may encrypt the personal identification number by using the session key data, and the web authentication module of the browser of the electronic device 720 may provide another input command based on the FIDO2 protocol to the authentication module of the security key device 710. The another input command may have a command format of an authentication command regulated by the FIDO2 protocol. In operation S708, the electronic device 720 outputs the another input command to the security key device 710, and the another input command may include a specific header, a signature request command, a signature generation reference data, and the encrypted personal identification number. In operation S709, when the authentication module of the security key device 710 determines that the input command is used to access the management module according to the specific header, the security key device 710 may prompt the user to press the confirmation unit of the security key device 710, for example, by emitting a prompt light or a prompt sound by an additional light-emitting unit or speaker unit, to allow output of the confidential data.

After the security key device 710 senses the touch of the user 730, in operation S710, after the management module of the security key device 710 decrypts and verifies the encrypted personal identification number and the verification is passed, the management module of the security key device 710 may generate a signature data based on the PKI protocol according to the signature request command and the signature generation reference data in the another input command, so that the authentication module of the security key device 710 can obtain the above signature data generated from the management module. In other words, different from the embodiment in FIG. 6 which verifies the personal identification number by the FIDO2 protocol, this embodiment verifies the personal identification number by the management module of the security key device 710 to effectively verify the holder of the security key. In operation S711, the authentication module of the security key device 710 outputs the signature data to the web application of the electronic device 720 through the communication module, so that the web application of the electronic device 720 can execute relevant identity authentication operations. Therefore, the security authentication system 700 of this embodiment can provide a secure identity authentication function.

However, in some other embodiments of the disclosure, if the confirmation unit (e.g., the confirmation unit 140 in FIG. 1A) adopted in the security key device 710 of this embodiment is a fingerprint sensor, in this embodiment, steps S702 to S707 for verifying the holder of the security key may be omitted, and only steps S701 and S708 to S711 are executed. In other words, in another embodiment, the security key device 710 may first execute fingerprint sensing through the confirmation unit, and the security key device 710 may then execute fingerprint verification to verify the holder of the security key.

In summary of the above, the security key device, the security authentication system, and the security authentication method of the disclosure may provide relevant authentication functions of the FIDO2 protocol and the PKI protocol for an identity authentication request required by a web application on the browser. In addition, the security key device, the security authentication system, and the security authentication method of the disclosure may transmit, in a command format of the FIDO2 protocol, the confidential data generated based on the PKI protocol to the web application of the browser to execute relevant login operations. Therefore, the web application can provide multiple login mechanisms and realize secure identity authentication functions.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A security key device, comprising:
   a physical interface adapted to plug into an electronic device;
   a communication module;
   a security processing unit, configured to execute programs of an authentication module, a bridge module, and a management module, wherein the programs of the authentication module, the bridge module, and the management module are stored in the security key device;
   a processing unit, coupled to the communication module and the security processing unit; and
   a confirmation unit coupled to the processing unit,
   wherein the authentication module is configured to operate according to a Fast IDentity Online protocol, and the management module is configured to operate according to a Public Key Infrastructure (PKI) protocol, and the management module is further configured to store key data which are generated by the management module according to the Public Key Infrastructure protocol,
   wherein the authentication module receives an input command through the communication module, the input command is provided by a web authentication module of a browser executed by the electronic device based on the Fast IDentity Online protocol, and the authentication module determines that the input command is used to be executed by the authentication module or used to access the management module through the bridge module according to a header of the input command, so that the management module outputs the key data to the authentication module,
   wherein when the authentication module determines that the input command is used to access the management module through the bridge module, the bridge module determines whether the confirmation unit provides a confirmation signal, so as to output a confidential data of the management module to the authentication module, and then further provide the confidential data to the electronic device by the authentication module, wherein the confidential data is generated based on the PKI protocol.

2. The security key device according to claim 1, wherein when the authentication module determines that the input command is used to access the management module through the bridge module, the authentication module obtains a certificate data from the management module according to a certificate request command contained in the input command, the certificate data is generated based on the Public Key Infrastructure protocol, and the authentication module outputs the certificate data to the electronic device through the communication module.

3. The security key device according to claim 2, wherein before the authentication module receives the input command, the authentication module and the web authentication module of the browser execute a personal identification number verification of the Fast IDentity Online protocol.

4. The security key device according to claim 1, wherein when the authentication module determines that the input command is used to access the management module through the bridge module, the authentication module obtains a signature data from the management module according to a signature request command and a signature generation reference data contained in the input command, the signature data is generated based on the Public Key Infrastructure protocol, and the authentication module outputs the signature data to the electronic device through the communication module.

5. The security key device according to claim 4, wherein before the authentication module receives the input command, the authentication module and the web authentication module of the browser execute a personal identification number verification of the Fast IDentity Online protocol.

6. The security key device according to claim 1, wherein when the authentication module determines that the input command is used to access the management module through the bridge module, the authentication module obtains a session key data from the management module according to a verification request command contained in the input command, the session key data is generated based on a key exchange mechanism, and the authentication module outputs the session key data to the electronic device through the communication module.

7. The security key device according to claim 6, wherein the web authentication module of the browser encrypts a personal identification number by using the session key data to generate an encrypted personal identification number, and the web authentication module of the browser provides another input command to the authentication module based on the Fast IDentity Online protocol, wherein the another input command comprises the encrypted personal identification number.

8. The security key device according to claim 7, wherein the authentication module provides the encrypted personal identification number to the management module through the bridge module, so that the management module decrypts the encrypted personal identification number by using the session key data, and the management module verifies the personal identification number, wherein when verification of the personal identification number is passed, the authentication module obtains a signature data from the management module according to a signature request command and a signature generation reference data contained in the input command, the signature data is generated based on the Public Key Infrastructure protocol, and the authentication module outputs the signature data to the electronic device through the communication module.

9. The security key device according to claim 1, wherein the communication module is adapted to execute at least one of a Universal Serial Bus and a Near-Field Communication protocol, or is adapted to execute at least one of a Bluetooth communication protocol and the Near-Field Communication protocol.

10. A security authentication system comprising:
an electronic device configured to execute a browser; and
a security key device adapted to plug in the electronic device and comprising:
  a communication module;
  a security processing unit configured to execute programs of an authentication module, a bridge module, and a management module, wherein the programs of the authentication module, the bridge module, and the management module are stored in the security key device,
  wherein the authentication module is configured to operate according to a Fast IDentity Online protocol, and the management module is configured to operate according to a Public Key Infrastructure (PKI) protocol, and the management module is further configured to store key data which are generated by the management module according to the Public Key Infrastructure protocol;
  a processing unit coupled to the communication module and the security processing unit; and
  a confirmation unit coupled to the processing unit, wherein the authentication module receives an input command through the communication module, the input command is provided based on the Fast IDentity Online protocol by a web authentication module of the browser executed by the electronic device, and the authentication module determines that the input command is used to be executed by the authentication module or the input command is used to access the management module through the bridge module according to a header of the input command, so that the management module outputs the key data to the authentication module,
  wherein when the authentication module determines that the input command is used to access the management module through the bridge module, the bridge module determines whether the confirmation unit provides a confirmation signal, so as to output a confidential data of the management module to the authentication module, and then further provide the confidential data to the electronic device by the authentication module, wherein the confidential data is generated based on the PKI protocol.

11. The security authentication system according to claim 10, wherein when the authentication module determines that the input command is used to access the management module through the bridge module, the authentication module obtains a certificate data from the management module according to a certificate request command contained in the input command, the certificate data is generated based on the Public Key Infrastructure protocol, and the authentication module outputs the certificate data to the electronic device through the communication module.

12. The security authentication system according to claim 11, wherein before the authentication module receives the input command, the authentication module and the web authentication module of the browser execute a personal identification number verification of the Fast IDentity Online protocol.

13. The security authentication system according to claim 10, wherein when the authentication module determines that the input command is used to access the management module through the bridge module, the authentication module obtains a signature data from the management module according to a signature request command and a signature generation reference data contained in the input command, the signature data is generated based on the Public Key Infrastructure protocol, and the authentication module outputs the signature data to the electronic device through the communication module.

14. The security authentication system according to claim 13, wherein before the authentication module receives the input command, the authentication module and the web authentication module of the browser execute a personal identification number verification of the Fast IDentity Online protocol.

15. The security authentication system according to claim 10, wherein when the authentication module determines that the input command is used to access the management module through the bridge module, the authentication module obtains a session key data from the management module according to a verification request command contained in the input command, the session key data is generated based on a key exchange mechanism, and the authentication module outputs the session key data to the electronic device through the communication module.

16. The security authentication system according to claim 15, wherein the web authentication module of the browser encrypts a personal identification number by using the session key data to generate an encrypted personal identification number, and the web authentication module of the browser provides another input command to the authentication module based on the Fast IDentity Online protocol, wherein the another input command comprises the encrypted personal identification number.

17. The security authentication system according to claim 16, wherein the authentication module provides the encrypted personal identification number to the management module through the bridge module, so that the management module decrypts the encrypted personal identification number by using the session key data, and the management module verifies the personal identification number, wherein when verification of the personal identification number is passed, the authentication module obtains a signature data from the management module according to a signature request command and a signature generation reference data contained in the input command, the signature data is generated based on the Public Key Infrastructure protocol, and the authentication module outputs the signature data to the electronic device through the communication module.

18. The security authentication system according to claim 10, wherein the communication module is adapted to execute at least one of a Universal Serial Bus and a Near-Field Communication protocol, or is adapted to execute at least one of a Bluetooth communication protocol and the Near-Field Communication protocol.

19. A security authentication method adapted for a security key device and an electronic device comprising:

storing and executing programs of an authentication module, a bridge module, a management module, and a confirmation unit by the security device, wherein:

the authentication module is configured to operate according to a Fast IDentity Online protocol, and         the management module is configured to operate according to a Public Key Infrastructure (PKI) protocol, and the management module is further configured to store key data which are generated by the management module according to the Public Key Infrastructure protocol,     coupling the security key device to the electronic device;

executing a browser through the electronic device;

receiving, by the security key device, an input command provided based on the Fast IDentity Online protocol by a web authentication module of the browser executed by the electronic device;

determining, by the authentication module according to a header of the input command, that the input command is used to be executed by the authentication module or used to access the management module through the bridge module, so that the management module outputs the key data to the authentication module; and     when the authentication module determines that the input command is used to access the management module through the bridge module, determining, by the bridge module, whether the confirmation unit provides a confirmation signal, so as to output a confidential data of the management module to the authentication module, and then further provide the confidential data to the electronic device by the authentication module, wherein the confidential data is generated based on the PKI protocol.

* * * * *